United States Patent [19]
Horne et al.

[11] Patent Number: 5,237,694
[45] Date of Patent: Aug. 17, 1993

[54] PROCESSING SYSTEM AND METHOD INCLUDING LOCK BUFFER FOR CONTROLLING EXCLUSIVE CRITICAL PROBLEM ACCESSES BY EACH PROCESSOR

[75] Inventors: Stephen P. Horne; Seungyoon Song, both of Austin, Tex.

[73] Assignee: Advanced Micro Devices, Inc., Sunnyvale, Calif.

[21] Appl. No.: 707,855

[22] Filed: May 30, 1991

[51] Int. Cl.$^5$ ............... G06F 12/14; G06F 15/16
[52] U.S. Cl. ............................ 395/725; 395/425; 364/228.1; 364/228.3; 364/240.1; 364/246.6; 364/246.8; 364/DIG. 1
[58] Field of Search ............ 395/425, 650, 325, 375, 395/725, 250; 340/825.31, 825.5; 370/85.1; 380/4

[56] References Cited

U.S. PATENT DOCUMENTS

| | | | |
|---|---|---|---|
| 4,488,217 | 12/1984 | Binder et al. | 364/200 |
| 4,574,350 | 3/1986 | Starr | 364/200 |
| 4,587,609 | 5/1986 | Boudreau et al. | 364/200 |
| 4,775,955 | 10/1988 | Liu | 364/900 |
| 4,835,672 | 5/1989 | Zenk et al. | 364/200 |
| 4,982,322 | 1/1991 | Eggers et al. | 364/200 |
| 5,029,070 | 7/1991 | McCarthy et al. | 364/200 |
| 5,060,144 | 10/1991 | Sipple et al. | 364/200 |
| 5,115,499 | 5/1992 | Stiffler et al. | 395/425 |

Primary Examiner—Michael R. Fleming
Assistant Examiner—Gopal C. Ray
Attorney, Agent, or Firm—Foley & Lardner

[57] ABSTRACT

There is described a system and method for use in a processing system of the type including a plurality of processor subsystems, each processor subsystem including a processor, and being coupled together and to a shared memory by a common bus, wherein the system and method permits exclusive execution of critical sections by each of the processors. A lock buffer associated with each of the processors caches the value of the interlock variable and a control section locally tests the stored interlock variable value responsive to an instruction from its processor. If the control section determines that the interlock variable has the available value, it causes the available value of the interlock variable to be conveyed to its associated processor and the busy value to be written to the local lock buffer and over the common bus to the shared memory under a write-through policy and for updating each lock buffer associated with the other processors under a write-update policy. When its processor completes its critical section, the control section causes the available value of the interlock variable to be written to the local lock buffer and over the common bus to the shared memory so that the other lock buffers update their stored values of the interlock variable to the available value.

24 Claims, 2 Drawing Sheets

PROCESSING SYSTEM AND METHOD INCLUDING LOCK BUFFER FOR CONTROLLING EXCLUSIVE CRITICAL PROBLEM ACCESSES BY EACH PROCESSOR

BACKGROUND OF THE INVENTION

The present invention generally relates to a processing system of the type including a plurality of processor subsystems and more particularly to such a processing system and method wherein each processor subsystem includes a lock buffer for controlling exclusive critical program section accesses by the processor subsystems.

Processing systems may include a plurality of processors, each forming a processor subsystem, which require access to a shared memory over a common bus in order to execute instructions in accordance with their respective programs. Such programs may include related program portions which require a processor to use resources, such as shared memory, which other processors must also be required to use when executing their related program portions. Because such resources are shared, a processor must execute a related program section individually and not simultaneously with the execution of a related program portion by another processor in order to guarantee correct operation. Such related program portions are known as critical sections and multiprocessor systems must be arranged to provide a processor exclusive access to a shared resource, such as a shared memory, by assuring that only one processor is executing a critical section at any one time.

Hence, in a shared memory multiprocessor system, provision must be made to allow a processor to have exclusive access to some shared resource during the time in which it is executing a critical section. When a processor is executing a critical section, no other processor can be in a related critical section. A critical section must be guarded so that only one processor can be in a critical section at any one time. The guard may be a code segment that precedes a critical section and which has the function to prevent more than one processor from executing a critical section.

One prior art method for implementing the guard into a critical section uses interlock variables. An interlock variable may have one of two values, an available value indicating that no processor is executing a critical section, and a busy value indicating that a processor is executing a critical section. In accordance with this method, the shared memory includes a memory location for storing the value of the interlock variable and each processor includes a register. When a processor wishes to enter a critical section, it reads the interlock variable within the memory location of the shared memory and loads that value of the interlock variable into its register. The processor also writes back to the interlock variable memory location of the shared memory the busy value of the interlock variable. The reading and writing of the interlock variable are performed atomically so that no other processor can access the common bus between the read and the write. If, following the read and the write, the register of the processor contains a busy value, the processor will not enter its critical section but instead will perform the read and write operation again. However, if the register of the processor contains the available value of the interlock variable, the processor will enter its critical section.

The foregoing forms a loop in which the interlock variable in the interlock variable memory location of the shared memory is being tested. Such a loop is a type of guard known as a spin-lock. A busy value of the interlock variable indicates to the testing processor that another processor "owns" the interlock variable and is in a critical section. An available value of the interlock variable indicates that no processor is in its critical section. This processor acquires the interlock variable by writing the busy value into the interlock variable to communicate to all the processors that it is in its critical section. The processor then enters its critical section and no other processor wishing to enter a critical section will be able to do so until the processor in its critical section has completed its critical section.

When an owning processor completes execution of its critical section, it then communicates this fact to the other processors by writing the available value to the interlock variable in the shared memory. The next processor wishing to enter a critical section will then test the available value of the interlock variable and perform the same operations to enter its critical section. Ownership transfer of the interlock variable thus occurs when one processor writes the available value into the interlock variable and another processor subsequently acquires it in the manner described above.

While this method simplifies the implementation of assuring exclusive access to a critical section, the common bus becomes a performance bottleneck. This results because a processor wishing to acquire the interlock variable and enter a critical section must continually utilize the common bus to test the value of the interlock variable in the shared memory.

Another and still more efficient method of providing exclusive access to a critical section by a processor employs a cache associated with each of the processors for storing, locally to each processor, the most recent value of the interlock variable. Such caches can allow the value of the interlock variable to be modified relative to the shared memory. When the cache of another processor attempts to read the value of the interlock variable from the shared memory, the cache with the most recently modified value of the interlock variable intervenes and supplies the value of the interlock variable instead of the shared memory. In this way, all of the caches see the same correct value of the interlock variable even though the caches may be more up-to-date than the shared memory.

In such a system, when a processor desires to enter a critical section, its cache fetches the value of the interlock variable from either memory or the cache having the most recently updated value of the interlock variable, stores it, and then sends that value to its associated processor. If the interlock variable has a busy value, the cache does not follow the read with a write. Subsequent testing of the value of the interlock variable by this processor is performed locally in its cache, and, as a result, the shared bus is not accessed for this purpose. All processors wishing to enter a critical section obtain the busy value of the interlock variable in its associated cache and goes into a loop, with each processor testing its local copy.

Eventually, the owning processor releases the interlock variable by executing a write instruction for writing the available value of the interlock variable on the shared bus while a "LOCK pin" is asserted. Each cache with a copy of the interlock variable invalidates its copy upon seeing the locked write. The next time such a processor wishes to enter a critical section, its cache will obtain, over the common bus, the available value of the interlock variable from either the shared memory or a cache, will become the owner of the interlock variable, and locally set the value of the interlock variable in its cache to the busy value. Thus, processors that subsequently read the interlock variable will read a busy value.

Hence, in accordance with the above-described prior art method, the common bus is used more efficiently by allowing each processor to cache the value of the interlock variable locally within its cache and to locally test the value of the interlock variable without using the common bus except for initially loading the interlock variable into its cache. Considerable common bus traffic still occurs, however, after a processor completes a critical section and writes the available value to the interlock variable. This is because all processors invalidate their copies of the value of the interlock variable when the owning processor releases the interlock. Each processor must then in turn obtain the new value of the interlock variable by the common bus, making the common bus a bottleneck in the process. With this method, the number of common bus accesses each time ownership transfer of the interlock occurs is proportional to the number of processors waiting to enter a critical section. This level of common bus activity is still too high for processing systems having a large number of processors.

Another and still more efficient method and processing system for providing exclusive access to a critical section by a processor is fully disclosed and claimed in copending United States patent application, Ser. No. 07/513,806, filed Apr. 24, 1990, for "Interlock Variable Acquisition System and Method" in the names of the inventors of the instant invention and which is also assigned to the assignee of the present invention. That system also utilizes a cache associated with each of the processors for storing, locally to each processor, the most recent value of the interlock variable. When a processor completes a critical section, it broadcast writes the available value of the interlock variable over the common bus to the other caches associated with processors which share the interlock variable, to thus release the interlock variable. When another processor subsequently wishes to enter a critical section, it tests the value of the interlock variable in its cache since it did not invalidate its copy when the interlock variable was released but instead updated the value. If this processor detects the available value it proceeds to first obtain the common bus. If the bus is obtained before the value of the interlock variable is changed to the busy value by another processor, the busy value is then written into the local cache and broadcast written to the other caches while the available value is returned to the now owning processor. The immediately foregoing method further reduces common bus traffic since all caches contain the most recent value of the interlock variable and need not access the common bus to first acquire the most recent value, unless, for some reason, the value in a cache is invalid. Hence, in most cases, the only bus traffic required for accessing a critical section is by the accessing processor when it acquires the interlock variable and when it releases the interlock variable.

However, utilizing caches for obtaining and releasing an interlock variable still exhibits some deficiencies. For example, the main purpose for providing caches is to store data locally to a processor to decrease the frequency of common bus accesses to obtain data from shared memory to support processor executions. To take advantage of what is well known in the art as locality of reference, caches are generally arranged to store data in multiple-word blocks. There are two aspects of the locality of reference: temporal and spatial. The temporal locality of reference states that a processor is likely to access the same location again in short time. The spatial locality of reference states that a processor is more likely to access locations that are close (may be adjacent) to each than are far from each other.

Caches take advantage of the spatial locality of reference in the following manner. When a cache is reading from memory the location that is requested by the processor but is not in cache, it reads in the location being requested and several others adjacent to it in the hopes that the processor will use the other locations in the near future. However, access patterns of interlock variables do not show spatial locality of reference. In other words, if caches are used to store the interlock variables in its multiple-word blocks, the locations that are read from memory but not specifically requested by the processor are not likely to be used by the processor. For the caching of interlock variables, then, the multiple-word block organization is inefficient because additional bus cycles are needed to read the unwanted locations from memory and because the space being occupied by the unwanted locations is wasted. Furthermore, caches with multiple-word blocks to store the interlock variables could have a negative effect due to what is known in the art as the coherency overhead. The coherency is the act of keeping multiple copies of the same data identical in different caches for correct operation. Keeping caches coherent requires using shared bus to notify the caches of any changes in data that is in more than one cache. This is known as the coherency overhead. Because the coherency is maintained on a block basis, that is there is only one shared bit to indicate that "all" of the words in the block is shared or not, a coherency action is needed whenever processor writes to one location in a block that is shared. Consequently, the probability of requiring a coherency action on a write to a block containing four words is greater than on a write to a block containing only a single word.

Another deficiency in using conventional caches to store interlock variables is that caches are generally configured to perform one read or write at a time. When a cache is being accessed from the common bus, it cannot be accessed by its local processor. As a result, local processing will be interrupted; this is a condition referred to as processor lock-out. This reduces the processing efficiency of the overall processing system. Interlock variables are often shared and therefore contribute to processor lock-out because coherency actions through the common bus are required on every write to a shared variable.

A further deficiency in using caches to store interlock variables relates to the use of hierarchical caches. In the past, this has not been a significant problem because each processor has been provided with just one level of cache. However, multiple-level caches are now being introduced and will most likely become a prominent practice in the future. To simplify cache coherency mechanisms, multiple-level caches use what is known as the "inclusion property." The inclusion property states that the contents of the primary cache, which is the one that is physically closer to the processor and may be even in the same chip as the processor, is a subset of the contents of the secondary cache in a two-level cache system. The usual two-level cache organization is to connect only the secondary cache to the shared bus so that the primary cache can be shielded from the coherency activities that occur on the shared bus. Since the secondary cache contains everything that is in the primary cache, information necessary to maintain coherency is readily available in the secondary cache, often without disturbing the primary cache.

An efficient way of managing interlock variables in a two-level cache is to store them only in the secondary cache. If the interlock variables are stored in the primary caches, as well as in the secondary cache to follow the inclusion property, any writes to them would likely require coherency actions since they are likely to be shared. The coherency actions would involve updating both the primary and secondary caches. The updates would have to be atomic with respect to the processors' access to either the primary or the secondary cache. The coherency actions would be simpler and more efficient if the interlock variables are kept only in the secondary cache because the primary cache need not be modified by the coherency actions. However, to store the interlock variables only in the secondary cache requires a way for the processor to access the secondary cache without accessing the primary cache. This bypass path is an addition to the usual two-level cache organization where the processor does not need to access the secondary cache directly — only the primary cache communicates with the secondary cache in the usual two-level cache organization. In most cases, the processor is designed to be even ignorant of the fact that a secondary cache exists so that the use of secondary cache can be made optional.

The present invention provides solutions to all of the aforementioned deficiencies of prior art processing systems for acquiring and releasing interlock variables. Instead of storing the interlock variables in caches primarily arranged for storing data, the processing system of the present invention provides each processor with a local buffer dedicated for storing interlock variables and related control bits. As a result, the dedicated buffers may be tailored for their intended use to increase the storage efficiency for storing interlock variables. As will be seen hereinafter, the dedicated buffers of the processing system and the method of using the same in accordance with the present invention also significantly reduce the probability of processor lock out, may be readily employed in hierarchical cache systems without unduly adding complexity, and even further reduce traffic on the common bus because when accessed over the common bus for the acquisition or release of an interlock variable, only the interlock variable and its control bits need be carried on the common bus as compared to a multiple-word block.

SUMMARY OF THE INVENTION

The present invention provides a processing system of the type including a plurality of processor subsystems, a memory shared by the processor subsystems, and a common bus coupling the processor subsystems together and to the shared memory. The processing system is arranged to permit only one of the processor subsystems to execute a critical program section at a time wherein the execution of a critical program section requires the use of processing system resources shared with at least one other processor subsystem. The processing system includes a processor associated with each of the processor subsystems for executing program instructions including critical program sections, a memory portion within the shared memory for storing the value of an interlock variable, the interlock variable having a busy value indicating that a processor subsystem is currently executing a critical program section or an available value indicating that none of the processor subsystems is currently executing a critical program section, and lock buffer means associated with each processor subsystem dedicated for storing the value of the interlock variable. Each lock buffer is coupled to the common bus and to its associated processor. The processing system further includes control means associated with each processor subsystem and being responsive to a command instruction from its associated processor indicating the start of a critical program section for detecting the value of the interlock variable stored in its associated lock buffer means, for causing the conveyance to its associated processor of a detected busy value of the stored interlock variable to preclude its associated processor from entering the critical program section and for causing the conveyance of a detected available value of the interlock variable to its associated processor to permit its associated processor to execute the critical program section and to cause the conveyance of the busy value of the interlock variable to its associated lock buffer and over the common bus to the memory portion of the shared memory and the lock buffer means associated with the other processor subsystems.

The control means may further be arranged to be responsive to a critical program section complete instruction from its associated processor for causing the available value of the interlock variable to be conveyed to its associated lock buffer and to be conveyed over the common bus to the memory portion of the shared memory and the lock buffer means associated with the other processor subsystems for releasing the interlock variable.

The invention further provides a method for use in a processing system of the type including a plurality of processors coupled to each other and to a shared memory over a common bus, the processors being arranged to execute program instructions including critical program sections requiring exclusive execution thereof, and wherein the method permits exclusive execution of critical sections by each of the processors. The method comprises the steps of providing each processor with lock buffer means dedicated for storing the value of an interlock variable and storing within each lock buffer means and the shared memory the value of the interlock variable, wherein the value is either an available value indicating that none of the processors is currently executing a critical section or a busy value indicating that one of the processors is currently executing a critical section. The method further includes the steps of detecting the value of the interlock variable in one of the lock buffer means responsive to a command instruction from its associated processors indicating the start of a critical program section, conveying the available value of the interlock variable to the processor issuing the command instruction and conveying, over the common bus, the busy value of the interlock variable to the shared memory and the other lock buffer means associated with each processor other than the processor issuing the command instruction for updating the value of the interlock variable stored in the shared memory and the other lock buffer means to the busy value after detecting the available value of the interlock variable in the lock buffer means associated with the processor issuing the command instruction.

The method may also include the further steps of conveying from the processor which issued the command instruction the available value of the interlock variable to its associated lock buffer means and, over the common bus, to the shared memory and to each of the other lock buffer means for updating the value of the interlock variable to the available value responsive to the processor which issued the command instruction issuing a critical section complete instruction.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings in the several figures of which like reference numerals identify identical elements, and wherein:

DETAILED DESCRIPTION OF THE PREFERRED EMBODIMENT

Figure 1:
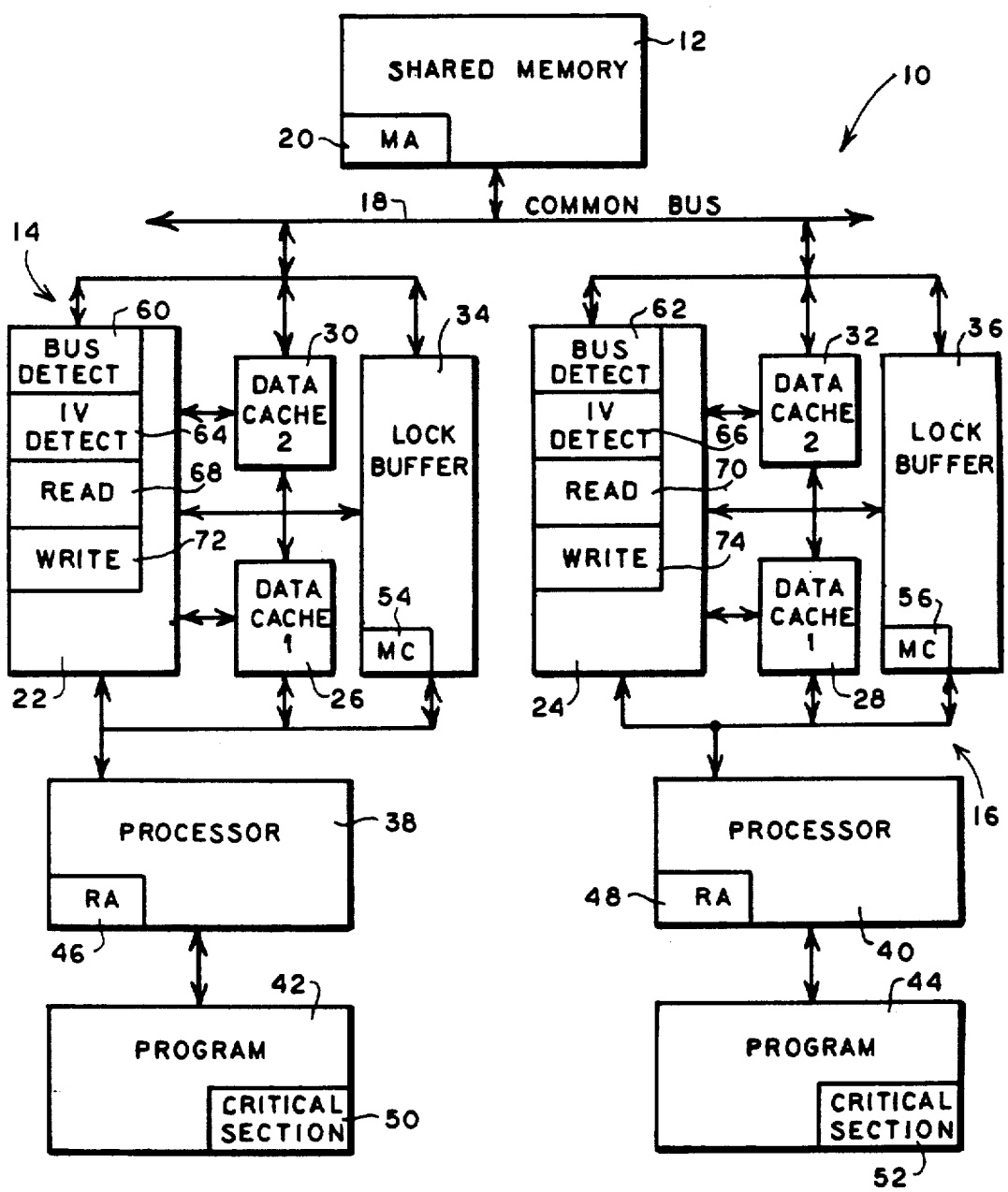
FIG. 1 is a block diagram of a processing system embodying the present invention.

Referring now to FIG. 1, it illustrates, in block diagram form, a processing system 10 embodying the present invention. The processing system 10 generally includes a shared memory 12, a first processor subsystem 14, a second processor subsystem 16, and a common bus 18. As will be noted in FIG. 1, the processor subsystems 14 and 16 are coupled together by the common bus 18 and are also coupled to the shared memory 12 by the common bus 18. As will be appreciated hereinafter, the processing system 10 may incorporate additional processor subsystems for implementing the present invention to advantage and that only a pair of processor subsystems are illustrated so as to not unduly complicate the description of the preferred embodiment of the present invention.

The shared memory 12 includes a memory portion 20 for storing the value of an interlock variable (MA) to indicate whether a processor subsystem is or is not currently in a critical section. As will be seen hereinafter, the value of the interlock variable stored in memory portion 20 will be the most current value of the interlock variable. The interlock variable (MA) may have either an available value indicating that no processor subsystem is in a critical section or a busy value indicating that a processor subsystem is in a critical section. For purposes of this preferred embodiment, the busy value is less than zero, and preferably, minus one ($-1$) and the available value is equal to or greater than zero, and preferably, zero (0).

Each of the processor subsystems 14 and 16 generally includes a control section 22 and 24, a first data cache 26 and 28, a second data cache 30 and 32, a lock buffer 34 and 36, a processor 38 and 40, and a program section 42 and 44. Each of the processor subsystems 14 and 16 include two levels of data cache 26,30 and 28,32 to illustrate the applicability of the present invention in processing systems which include processor subsystems arranged in a hierarchical data cache configuration.

Each of the processors 38 and 40 include a register 46 and 48 respectively. The registers 46 and 48 are provided for storing a value of the interlock variable received from its respective lock buffer 34 and 36 respectively.

The program sections 42 and 44 associated with processors 38 and 40 respectively provide execution program instructions. Each of the program sections 42 and 44 include a critical program section 50 and 52 respectively. For purposes of this preferred embodiment, the critical program sections 50 and 52 are related program portions which should not be executed by the processor subsystems 14 and 16, and more particularly, by processors 38 and 40 simultaneously. If a processor wishes to enter a critical program section and sees that the value of the interlock variable stored in its register is the available value, it will enter its critical program section. However, if the value of the interlock variable stored in its register is the busy value, the processor will not enter its critical program section.

Data caches 26 and 30 are associated with processor 38 and data caches 28 and 32 are associated with processor 40 to permit data to be stored locally with respect to the processors 38 and 40. This permits the processors 38 and 40 to execute program instructions obtained from the program sections 42 and 44 on locally stored data to decrease the frequency of external processor accesses to the shared memory 12 over the common bus 18 for the purpose of executing the program instructions. The data caches 26, 28, 30, and 32 are preferably arranged to store data in multiple-word blocks to simplify the addressing of the storage locations within the data caches and to take advantage of locality of reference in cache access. As will be noted in FIG. 1, the data caches 26,30 and 28,32 are coupled to the common bus 18 to permit data to be written into the data caches from the common bus 18 and are also coupled to their respective processors 38 and 40 to permit data to be obtained from the data caches and to permit data to be written into the data caches by the processors.

The lock buffers 34 and 36 of processor subsystems 14 and 16 respectively are buffers dedicated for storing the value of interlock variables. Since interlock variables have poor locality of reference, the lock buffers 34 and 36 are preferably arranged to store the values of the interlock variables and their control bits in single word blocks. The lock buffers 34 and 36 are also coupled directly to the common bus 18 for receiving interlock variable values and associated control bits over the common bus and are also coupled to the respective processors 38 and 40 for providing the processors with the values of the interlock variables. One storage location for storing an interlock variable and one or more control bits is shown with respect to each of the lock buffers 34 and 36 as storage locations 54 and 56 respectively.

To facilitate control of accesses on common bus 18 by the processor subsystems 14 and 16, the control section 22 of processor subsystem 14 and the control section 24 of processor subsystem 16 each include a bus detector 60 and 62 respectively, an interlock variable detector 64 and 66 respectively, a read section 68 and 70 respectively, and a write section 72 and 74 respectively. As will also be noted in FIG. 1, the control sections 22 and 24 are also coupled to the common bus 18 and to their associated data caches, lock buffers, and processors.

The bus detectors 60 and 62 are provided for detecting the availability of the common bus 18. The interlock variable detectors 64 and 66 are provided for detecting the values of the interlock variables stored in the lock buffers 34 and 36 and to determine whether an access from either the common bus or the processor is a "locked" access. Interlock variable accesses are serviced by the lock buffers and non-interlock variable accesses are serviced by the data caches. Thus, a processor's lock buffer can be servicing an interlock variable access from the common bus while the processor's data cache is serving a non-interlock variable access from that processor. This reduces processor lock-out. The read sections 68 and 70 are provided for providing read control signals such as read addresses for the shared memory, the data caches, or the lock buffers, and the write sections 72 and 74 are provided for providing write control signals such as write addresses for the shared memory, the data caches, and the lock buffers.

As will be seen hereinafter, the system 10 utilizes a write-through policy with respect to processor accesses to the lock buffer. When a processor writes the value of an interlock variable to is local lock buffer, it also writes the value of the interlock variable on to the common bus 18 and to the memory portion 20 of the shared memory 12 by an address provided by its write section and the read sections of all other processor subsystems determine from the control bits associated with the interlock variable being written onto the common bus whether the interlock variable value should be stored into its associated lock buffer. If the value of the interlock variable written onto the common bus is to be written into a lock buffer, the associated read section will enable its associated lock buffer to obtain the interlock variable value directly from the common bus 18. In this manner, when the value of an interlock variable is written onto the common bus 18 to update the memory portion 20 of the shared memory 12, all other lock buffers are updated with the most recent value of the interlock variable. this is known as a write-update policy, as opposed to a write-invalidate policy.

Figure 2:
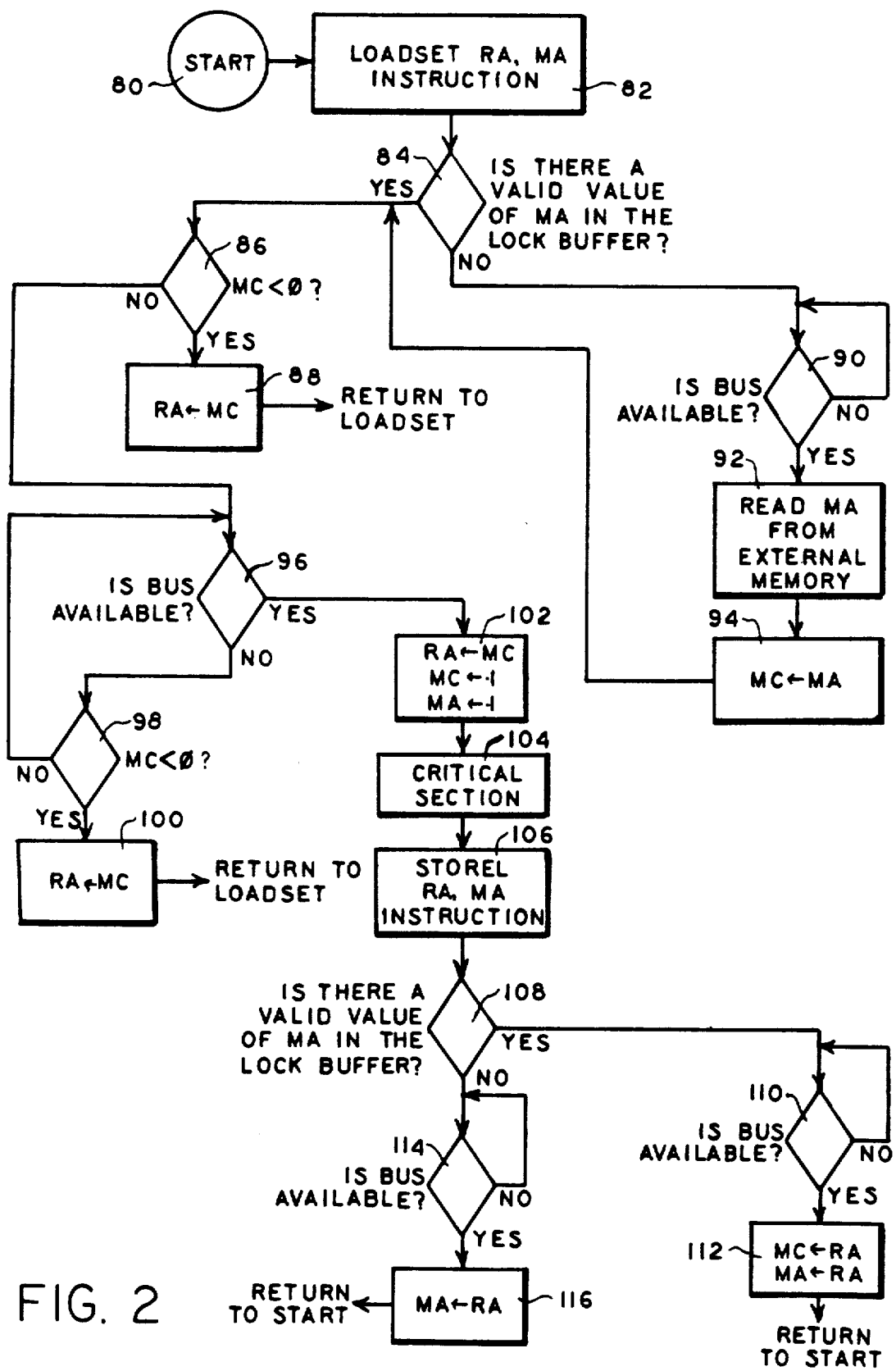
FIG. 2 is a flow diagram illustrating the manner in which the processing system of FIG. 1 may be implemented in accordance with the present invention.

The manner in which the system 10 may be implemented for acquiring and releasing interlock variables to thereby control access to critical program sections by the processor subsystems 14 and 16 may best be understood by making reference to the flow diagram of FIG. 2. The system and method begins at START in step 80 with each lock buffer waiting to receive a LOADSET or command instruction from its associated processor. When one of the processors wishes to enter a critical program section, it issues a command instruction illustrated in FIG. 2 in accordance with step 82 as a LOADSET instruction. For purposes of this description, it will be assumed that the LOADSET instructions has been issued by processor 38 of processor subsystem 14.

The LOADSET instruction issued by processor 38 in step 82 is received by the lock buffer 34 which then determines in step 84 if the value of the interlock variable stored in storage location 54 is valid. The lock buffer 34 makes this determination in response to a status bit in its storage location 54 which is stored with the interlock variable. Status bits and the use thereof are well known in the art and the manner in which the status bit is utilized by the lock buffer 34 may be performed in conformity to conventional status bit usage in the art. If the value of the interlock variable stored in storage location 54 is valid, the interlock variable detector 64 then determines if the value of the interlock variable stored in the storage location 54 is less than zero in accordance with step 86.

If the value of the interlock variable stored in storage location 54 is less than zero, this will indicate a busy value of the interlock variable and that another processor subsystem, such as processor subsystem 16, is in the process of executing a critical program section. As a result, in step 88, the lock buffer 34 conveys the busy value of the interlock variable stored in the storage location 54 to the register 46 of processor 38. The processor 38 now sees a busy value of the interlock variable in its register 46 and therefore does not enter its critical program section. After step 88 is completed, the system returns to await the receipt of another LOADSET instruction.

If in step 84 it was determined that storage location 54 of lock buffer 34 did not contain a valid value of the interlock variable, the bus detector 60 then, in step 90, determines if the common bus 18 is available. If the common bus is not available, the bus detector 60 continues to detect for the availability of the common bus 18. When the common bus 18 becomes available, the system proceeds to step 92 wherein the control section 22, through the read section 68, causes the value of the interlock variable to be read from the memory portion 20 of the shared memory 12. The value of the interlock variable is then conveyed in step 94 from the memory portion 20 of the shared memory 12 to the storage location 54 of lock buffer 34.

If in step 86 the interlock variable detector 64 determines that the value of the interlock variable stored in the storage location 54 is not less than zero, and thus is the available value, the bus detector 60 will then, in accordance with step 96, determine if the common bus 18 is available. If the common bus is not available, the interlock variable detector 60 will then, in step 98, determine if the value of interlock variable has changed to be less than zero (the busy value) since determining, in step 86, that the value of the interlock variable was not less than zero. In other words, if the bus is not available, the control section 22 determines if another processor has acquired the available value of the interlock variable since it last determined that the value of the interlock variable was the available value.

If the value of the interlock variable has changed to be less than zero, and thus to the busy value, the lock buffer 34 then, in step 100, conveys the busy value of the interlock variable stored in the storage location 54 to the register 46 of processor 38. The processor 38 will then not enter its critical program section and the system will return to receive another LOADSET instruction from processor 38.

If in step 98 the interlock variable detector 64 determines that the value of the interlock variable is not less than zero, and thus, is still available, the system returns to step 96 to permit the bus detector 60 to once again to determine if the common bus is available. As can thus be seen, if the common bus is not available, the control section 22 will continue to determine if the value of the interlock variable has changed. If the value has changed to the busy value, it causes the busy value to be conveyed to its processor so that the processor does not enter its critical program section and then the system returns. If the value of the interlock variable has not changed, the control section 22 returns to once again determine if the common bus is available.

If the bus detector 60 determines that the bus is available in step 96, the control section 22 then causes through its read and write sections 68 and 72, the available value of the interlock variable stored within the storage location 54 of the lock buffer 34 to be conveyed to the register 46 of the processor 38 and the busy value of the interlock variable to be written into the storage location 54 of lock buffer 34 in accordance with step 102. Also, in step 102, the control section 22 through the write section 72 causes the busy value of minus one (−1) to be written into the memory portion 20 of the shared memory 12 over the common bus 18. In accordance with the write-update policy, as the busy value of the interlock variable is being written to the memory portion 20 of the shared memory 12 over the common bus 18, the other lock buffers, such as storage location 56 in lock buffer 36 are updated with the new (busy) value of the interlock variable. As a result, all storage locations of all lock buffers storing the value of the interlock variable contain the most recent value of the interlock variable along with the memory portion 20 of the shared memory 12.

After step 102, processor 38 enters its critical program section in accordance with step 104. After completing its critical program section the processor 38 in step 106, issues a critical program section complete instruction referred to herein as a STOREL instruction. This causes the lock buffer 34 in step 108 to determine if it has a valid value of the interlock variable in its storage location 54. If it does, the bus detector 60 then, in step 110, determines if the common bus is available. If the common bus 18 is not available, it continues to detect the availability of the common bus. When the common bus 18 becomes available, the control section 22 through the write section 72, in step 112, causes the available value of the interlock variable stored in register 46 of processor 38 to be written to storage location 54 of lock buffer 34 and to be written to the memory portion 20 of the shared memory 12. As the available value of the interlock variable is written to the memory portion 20 of the shared memory 12 over the common bus 18, the other storage locations of the other lock buffers such as storage location 56 of lock buffer 36 will be updated with the new (available) value of the interlock variable. After completing step 112, the system returns to START.

If in step 108 it is determined that the storage location 54 of lock buffer 34 does not have a valid value of the interlock variable, the bus detector 60 then, in step 114, determines if the common bus 18 is available. If the common bus 18 is not available, the bus detector 60 continues to detect for the availability of the common bus 18. When the common bus 18 becomes available, the control portion 22, through the write portion 72, causes the value of the interlock variable stored in register 46 of processor 38 to be written to the memory portion 20 of the shared memory 12 over the common bus 18, which value will be the available value, and, at the same time, the storage locations of the other lock buffers such as storage location 56 of lock buffer 36 will be updated with the available value of the interlock variable. Following step 116, the system returns to START.

In summary, therefore, when a processor releases an interlock variable by writing the available value of the interlock variable to the memory portion of the shared memory, all other lock buffers are updated with the new value of the interlock variable. After a processor releases an interlock variable, all lock butters will have their own local copy of the available value of the interlock variable. To guarantee that only one processor actually acquires the interlock variable, if a lock buffer has an available value, the available value is not conveyed to the processor until the common bus is obtained. While waiting for the bus, the value of the local copy of the interlock variable is continually checked. This is performed because another processor may obtain access to the common bus first and perform its write operation to change the value of the interlock variable in the memory portion 20 of the shared memory 12 and in all other lock buffers. If the interlock variable is still the available value and the bus is acquired, the lock buffer conveys the available value to its processor and a write operation is performed to write the busy value of the interlock value to the memory portion 20 of the shared memory 12 and to also update all other lock buffers with the busy value. If, on the other hand, the value of the interlock variable stored locally within a lock buffer changes from the available value to the busy value before the bus is obtained, the respective lock buffer is caused to return the busy value of the interlock variable to its processor. If it is determined that the lock buffer contains the busy value of the interlock variable at the time of a critical section request of its processor, no further action is required other than to abort the write operation to the common bus and to convey the busy value to the requesting processor.

From the foregoing, it can be seen that the present invention provides a new system and method for acquiring and releasing interlock variables in a processing system of the type including a plurality of processors subsystems to permit only one processor subsystem to execute a critical program section at a time. Because each processor subsystem includes a lock buffer dedicated for storing interlock variables and related control bits, the dedicated buffers may be tailored for their intended use to increase the storage efficiency for storing interlock variables. In addition, the probability of processor lockout is significantly reduced since the operation of the lock buffers is independent of the operation of the data caches. Hence, a processor having its associated lock buffer being accessed over the common bus is still available to process operating instructions with respect to data stored locally in its data caches. Also, since the hardware needed for read-modify-write transactions to the lock buffer are localized, the design of processing subsystems using hierarchical caches may be simplified. Also, since only the interlock variables and their related control bits need be carried on the common bus for acquiring or releasing an interlock variable, common bus traffic for this purpose is reduced.

While a particular embodiment of the present invention has been shown and described, modifications may be made, and it is therefore intended to cover in the appended claims all such changes and modifications which fall within the true spirit and scope of the invention.

What is claimed is:

1. A processing system of the type including a plurality of processor subsystems, a memory shared by said plurality of processor subsystems, and a common bus coupling said plurality of processor subsystems together and to said shared memory, said processing system including a program store means for storing program instructions, said program instructions including at least one critical program section, said processing system being arranged to permit only one selected processor subsystem of said plurality of processor subsystems to execute a selected critical program section of said at least one critical program section at a time wherein said execution of said selected critical program section requires the use of processing system resources shared with at least one processor subsystem of said plurality of processor subsystems other than said selected processor subsystem, said processing system comprising:

- a processor associated with each of said plurality of processor subsystems for receiving selected program instructions from said program store means and executing said selected program instructions;
- a memory portion within said shared memory for storing an interlock variable value, said interlock variable value being a busy value indicating that one processor subsystem of said plurality of processor subsystems is currently executing a critical program section of said at least one critical program section or an available value indicating that none of said processor subsystems of said plurality of processor subsystems is currently executing a critical program section of said at least one critical program section;
- a respective lock buffer means associated with said associated processor of each respective processor subsystem of said plurality of processor subsystems, each said respective lock buffer means being dedicated for storing said interlock variable value, each said respective lock buffer means being coupled to said common bus and to said associated processor; and
- a respective control means associated with each said respective processor subsystem and being responsive to a command instruction from said associated processor indicating the start of a respective critical program section of said at least one critical program section for detecting said interlock variable value stored in said respective lock buffer means; said respective control means responding to detection of said busy value of said stored interlock variable value by causing the conveyance to said associated processor of said detected busy value to preclude said associated processor from entering said respective critical program section; said respective control means responding to detection of said available value of said stored interlock variable value by causing the conveyance of said detected available value to said associated processor to permit said associated processor to execute said respective critical program section, and by causing the conveyance of said busy value of said interlock variable value to said respective lock buffer and causing the conveyance of said busy value of said interlock variable value over said common bus to said memory portion of said shared memory and to said lock buffer means associated with other said processor subsystems of said plurality of processor subsystems than said respective processor subsystem.

2. A processing system as defined in claim 1 wherein said respective control means are responsive to a critical program section complete instruction from said associated processor for causing said available value of said interlock variable to be conveyed to said respective lock buffer and to be conveyed over said common bus to said memory portion of said shared memory and said lock buffer means associated with other said processor subsystems of said plurality of processor subsystems than said respective processor subsystem.

3. A processing system as defined in claim 2 wherein each said respective control means include bus detecting means for detecting the availability of said common bus responsive to the detection of said available value of said interlock variable value in said respective lock buffer means prior to said busy value of said interlock variable value being conveyed over said common bus and wherein said busy value of said interlock variable value is conveyed over said common bus after said detecting said availability of said common bus.

4. A processing system as defined in claim 2 wherein said respective lock buffer means are each arranged to determine whether said respective lock buffer means contains a valid value of said interlock variable value prior to said detection of said interlock variable value by said respective control means.

5. A processing system as defined in claim 4 wherein said respective control means each includes bus detecting means for detecting the availability of said common bus responsive to detecting that said respective lock buffer means does not contain a valid value of said interlock variable value.

6. A processing system as defined in claim 5 wherein said respective control means is each arranged to cause said valid value of said interlock variable value to be conveyed over said common bus from said memory portion of said shared memory to said respective lock buffer means when said bus detecting means detects said availability of said common bus.

7. A processing system as defined in claim 6 wherein said respective control means are each arranged to detect the value of said interlock variable value in said respective lock buffer means after the conveyance of said interlock variable value to said respective lock buffer means from said memory portion of said shared memory.

8. A processing system as defined in claim 3 wherein each said respective control means are each arranged for detecting a change in said interlock variable value to said busy value while said bus detecting means detects for said availability of said common bus.

9. A processing system as defined in claim 8 wherein said bus detecting means are each arranged to terminate said detecting said availability of said common bus responsive to said control means detecting said change in said interlock variable value to said busy value prior to said detection of said availability of said common bus.

10. A processing system as defined in claim 9 wherein said respective control means are each arranged to cause said busy value to be conveyed to said associated processor responsive to detecting said busy value in said respective lock buffer means prior to said bus detecting means detecting said availability of said common bus.

11. A method for use in a processing system of the type including a plurality of processors coupled to each other and to a shared memory over a common bus, said processing system further including a program store means for storing program instructions, each of said plurality of processors receiving selected program instructions from said program store and executing said selected program instructions, said program instructions including at least one critical program section requiring exclusive execution thereof, the method permitting exclusive execution of respective critical program sections of said at least one critical program section by respective processors of said plurality of processors and comprising the steps of:

provided each said respective processor with a respective lock buffer means dedicated for storing an interlock variable value;

storing within each said respective lock buffer means and within said shared memory said interlock variable value, said interlock variable value being either an available value indicating that none of said plurality of processors is currently executing a critical program section of said at least one critical program section or a busy value indicating that one of said plurality of processors is currently executing a critical program section of said at least one critical program section;

detecting said interlock variable value in one of said respective lock buffer means responsive to a command instruction from its associated respective processor indicating the start of said respective critical program section; and conveying said available value of said interlock variable value to said associated respective processor and conveying, over said common bus, said busy value of said interlock variable value to said shared memory and to other said lock buffer means associated with other said processors of said plurality of processors than said associated respective processor, whereby said interlock variable value stored in said shared memory and stored in said other lock buffer means is updated to said busy value after detecting said available value of said interlock variable value in said respective lock buffer means.

12. A method as defined in claim 11 including the step of conveying said busy value of said interlock variable value to said associated respective processor when said interlock variable value stored in said respective lock buffer means is said busy value, thereby precluding said associated respective processor from entering said respective critical program section.

13. A method as defined in claim 11 comprising the further step of storing in each said respective lock buffer means a validity bit associated with said interlock variable value, said validity bit indicating the validity of said interlock variable value.

14. A method as defined in claim 13 comprising the further step of determining whether said respective lock buffer means contains a valid value of said interlock variable value prior to detecting said interlock variable value.

15. A method as defined in claim 14 comprising the further step of detecting whether said common bus is available when said respective lock buffer means does not contain a valid value of said interlock variable value.

16. A method as defined in claim 15 further comprising the step of reading a valid value of said interlock variable value from said shared memory when said common bus is available.

17. A method as defined in claim 16 comprising the further step of conveying said valid value of said interlock variable value read from said shared memory to said respective lock buffer means.

18. A method as defined in claim 17 comprising performing the step of detecting said interlock variable value contained within said respective lock buffer means after conveying said valid value of said interlock variable value read from said shared memory to said respective lock buffer means.

19. A method as defined in claim 11 comprising the further steps of detecting availability of said common bus after detecting said available value of said interlock variable value in said respective lock buffer means of said associated respective processor.

20. A method as defined in claim 19 comprising the further step of repeatedly detecting said interlock variable value while detecting availability of said common bus.

21. A method as defined in claim 20 comprising the further step of terminating said detecting availability of said common bus upon detecting that said interlock variable value stored in said respective lock buffer means of said associated respective processor has changed to said busy value prior to detecting said availability of said common bus.

22. A method as defined in claim 21 comprising the further step of conveying said busy value to said associated respective processor responsive to detecting that said interlock variable value stored in said respective lock buffer means of said associated respective processor has changed to said busy value prior to detecting said availability of said common bus.

23. A method as defined in claim 11 comprising the further step of conveying said busy value of said interlock variable value to said respective lock buffer means of said associated respective processor when conveying said available value of said interlock variable value to said associated respective processor.

24. A method as defined in claim 11 comprising the further steps of conveying said available value of said interlock variable value from said associated respective processor over said common bus to said respective lock buffer means, to said shared memory, and to said other lock buffer means for updating said interlock variable value to said available value responsive to said associated respective processor issuing a critical section complete instruction.

* * * * *

UNITED STATES PATENT AND TRADEMARK OFFICE
CERTIFICATE OF CORRECTION

PATENT NO. : 5,237,694
DATED : August 17, 1993
INVENTOR(S) : Stephen C. Horne; Seungyoon P. Song It is certified that error appears in the above-indentified patent and that said Letters Patent is hereby corrected as shown below:

On the title page, item [54] anc column 1, line 4, "PROBLEM" should read --PROGRAM--.

On the title page, item [75], "Stephen P. Horne; Seungyoon Song" should read --Stephen C. Horne; Seungyoon P. Song--.

Signed and Sealed this

Eighth Day of March, 1994

Attest:

BRUCE LEHMAN

Attesting Officer     Commissioner of Patents and Trademarks